United States Patent [19]

Rapp et al.

[11] Patent Number: 4,560,606
[45] Date of Patent: Dec. 24, 1985

[54] BASALT COMPOSITIONS AND THEIR FIBERS

[75] Inventors: Charles F. Rapp; William H. Fausey, both of Newark; J. Ronald Gonterman, Granville, all of Ohio

[73] Assignee: Owens-Corning Fiberglas Corporation, Toledo, Ohio

[21] Appl. No.: 701,489

[22] Filed: Feb. 14, 1985

Related U.S. Application Data

[63] Continuation of Ser. No. 321,873, Nov. 16, 1981, abandoned, which is a continuation-in-part of Ser. No. 200,178, Oct. 24, 1980, abandoned.

[51] Int. Cl.$^4$ .................. C03B 37/02; C03B 37/06; C03C 13/00; C04B 43/02
[52] U.S. Cl. .................................. 428/141; 65/2; 65/5; 181/294; 252/62; 428/280; 428/357; 501/36
[58] Field of Search ............... 65/2, 5; 181/294; 252/62; 428/280, 357, 141; 501/36

[56] References Cited

U.S. PATENT DOCUMENTS 3,952,830  4/1976  Oshida et al. .
4,205,992  6/1980  Mogenser et al. .
4,366,251 12/1982  Rapp ..................................... 501/36
4,461,840  7/1984  Massol et al. ......................... 501/36

FOREIGN PATENT DOCUMENTS 2325415 12/1975  Fed. Rep. of Germany .
2005675  5/1983  German Democratic Rep. ... 501/36

OTHER PUBLICATIONS

Sheldon, "Forming Fibers from Basalt Rocks", Platinum Metals Review, vol. 21, pp. 18-24 (1977).

Primary Examiner—James C. Cannon
Attorney, Agent, or Firm—Ronald C. Hudgens; Patrick P. Pacella; John C. Smith

[57] ABSTRACT

Fiberizable basalt compositions are disclosed. The fibers are produced from natural basalt rock modified with alkaline earth metal oxides. The fibers can be used to make low density composites for ceiling tile or boards.

25 Claims, 3 Drawing Figures

BASALT COMPOSITIONS AND THEIR FIBERS

This application is a continuation of U.S. application Ser. No. 321,873, filed Nov. 16, 1981, and now abandoned which is a continuation-in-part of U.S. application Ser. No. 200,178, filed Oct. 24, 1980, and now abandoned.

TECHNICAL FIELD

This invention relates to fiberizable basalt compositions. The fibers of this invention can be used to make low density composites for ceiling tile or boards.

BACKGROUND ART

"Pure" basalt can easily be melted and formed as a glass. While basalt has the advantage of being a single component raw material for glass production, often times it is not suitable for forming fibers because the basalt melts are too viscous. In order to more easily fiberize basalt, modification to reduce viscosity may be necessary. A viscosity of approximately 10 poise (log n = 1.0) at 2600° F. is recommended in the literature as an "optimum" high temperature viscosity for forming mineral wool fibers. The viscosity of basalt at reasonable forming temperatures may be too high for producing satisfactory mineral wool (Log n = 1.0 at 3235° F.).

Viscosity modification, however, often affect the rate of crystallization, solidus temperature or softening point of the resulting fibers. The fibers should crystallize sufficiently rapid so as to be "fire resistant." Also, the fibers should not soften to the point where the ceiling tiles or boards will fall out of their suspension system during a fire.

These tiles are low density composites consisting primarily of mineral wool, clay, organic binders and organic fibers. During a fire, a number of complex reactions takes place in the composite which include organic binder and fiber burn-out, low temperature bonding between inorganics and high temperature deformation and crystallization of the mineral wool.

DISCLOSURE OF INVENTION

We now have developed a modified basalt composition for use in ceiling tile or boards. These modified compositions have a desirable viscosity and liquidus for glass forming and the desirable properties for product performance. We have found that basalts modified with alkaline earth metal oxides yield the proper viscosity for fiber forming without affecting the product performance of the resulting ceiling tile.

BEST MODE OF CARRYING OUT INVENTION

Figure 1:
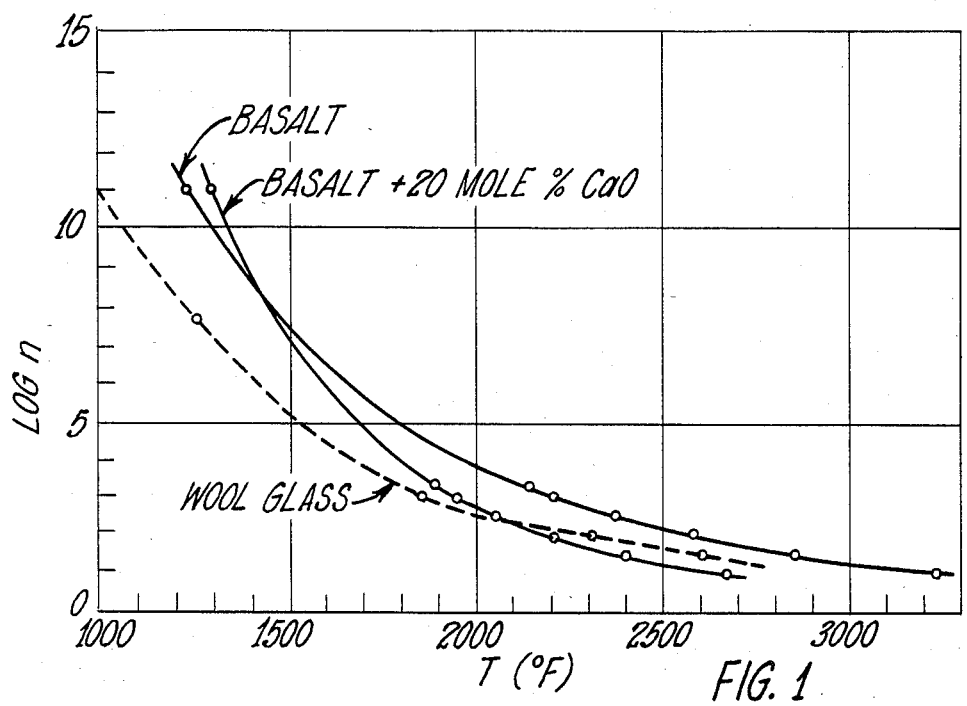
FIG. 1 is a plot of viscosity versus temperature for Yakima basalt and basalt plus 17.7 weight percent CaO (control basalt and Example II in Table I, respectively).

The alkaline earth metal oxides of this invention are oxides of Group IIA Metals: calcium, strontium, barium and magnesium. A preferred group of oxides is CaO and MgO with CaO being the most preferred oxide.

A variety of basalts can be employed in this invention. Generally these basalts are low alkali basalts of which Yakima basalt is an example. Oregon Yakima basalt appears to be suitable for commercial mineral wools.

Yakima Basalt has the following composition:

| Component | Weight Percent |
|---|---|
| $SiO_2$ | 53.0 |
| $Al_2O_3$ | 13.6 |
| CaO | 8.6 |
| MgO | 4.9 |
| FeO | 12.8 |
| $TiO_2$ | 2.1 |
| MnO | 0.2 |
| $K_2O$ | 1.0 |
| $Na_2O$ | 2.9 |
| $P_2O_5$ | 0.3 |
| $SO_3$ | 0.1 |
| $F_2$ | 0.1 |
| | 99.6 |

The modified compositions of this invention generally include 60 to 95 weight percent basalt, with the balance being additive oxides. Preferably, the compositions include 70 to 90 weight percent basalt, and most preferably 75 to 85 weight percent.

The amount of Group IIA metal oxides generally ranges from 5 to 40 weight percent. Preferably, the compositions include 10 to 30 weight percent oxides, and most preferably 15 to 25 weight percent.

Generally, the basalt compositions of this invention contain at least 12 weight percent CaO and 15 weight percent or less of MgO, based on the total weight of the composition. Generally, the composition contains 12 to 40 weight percent of CaO and 2 to 15 weight percent MgO. Preferably, the basalt compositions contain 14 to 30 weight percent CaO and 3 to 12 weight percent MgO. Most preferably, these amounts range from 15 to 25 and 4 to 11 weight percent, respectively.

The basalt compositions of this invention have a viscosity of log n = 1.0 at a temperature of 2950° F. or less. Preferably, the viscosity will be log n = 1.0 at a temperature ranging from 2600° to 2700° F.

Other oxides can be incorporated in the basalt with the oxides of this invention. Specific examples include $Al_2O_3$, $TiO_2$ and $SiO_2$. Generally, the amount of added $Al_2O_3$ or $SiO_2$ ranges up to 15.0 weight percent, preferably up to 10.0 weight percent. The amount of $TiO_2$ usually ranges up to 5.0 weight percent.

Various other impurities or tramp materials may be present in the glass compositions, without adversely affecting the glasses or fibers. These impurities will include chromic oxide ($Cr_2O_3$), zinc oxide, zircon oxides, oxides of vanadium, sulfates and phosphates. These impurities can enter the glass as raw material impurities or can be products formed by the chemical reaction of the molten glass with the furnace components. The basalts of this invention can include up to several percent by weight each of these other substituents. Generally, the amount of each substituent ranges up to 3.0 weight percent, preferably up to 2.0 weight percent.

Specific glass composition embodying the principles of this invention are described in Example I.

EXAMPLE I

TABLE I

|  | Control | 1 | 2 | 3 | 4 | Control | 5 | 6 | 7 | Control | 8 | 9 |
|---|---|---|---|---|---|---|---|---|---|---|---|---|
| | | | | | Weight Percent | | | | | | | |
| Basalt | 100 | 91.28 | 82.31 | 79.44 | 84.41 | 100 | 73.08 | 82.04 | 84.25 | 100 | 88.24 | 76.76 |
| CaO | | 8.72 | 17.69 | 12.80 | 9.07 | | 26.92 | 14.84 | 9.35 | | 8.67 | 8.25 |
| MgO | | | | | 6.52 | | | 2.16 | 6.31 | | | |
| $Al_2O_3$ | | | | 7.76 | | | | | | | | 14.99 |
| $TiO_2$ | | 3.09 | | | | | | | | | | |
| $SiO_2$ | | | | | | | | 0.96 | 0.09 | | | |
| | | | | | Weight Percent | | | | | | | |
| $SiO_2$ | 52.99 | 48.37 | 43.62 | 42.10 | 44.73 | 52.99 | 38.73 | 44.43 | 44.73 | 52.99 | 46.76 | 40.68 |
| $Al_2O_3$ | 13.60 | 12.41 | 11.19 | 18.56 | 11.48 | 13.60 | 9.94 | 11.16 | 11.46 | 13.60 | 12.00 | 25.43 |
| CaO | 8.61 | 16.58 | 24.78 | 19.64 | 16.34 | 8.61 | 33.21 | 21.90 | 16.60 | 8.61 | 16.27 | 14.86 |
| MgO | 4.89 | 4.46 | 4.02 | 3.88 | 10.65 | 4.89 | 3.57 | 6.17 | 10.43 | 4.89 | 4.31 | 3.75 |
| FeO | 12.79 | 11.67 | 10.53 | 10.16 | 10.80 | 12.79 | 9.35 | 10.49 | 10.78 | 12.79 | 11.29 | 9.82 |
| $TiO_2$ | 2.05 | 1.87 | 1.69 | 1.63 | 1.73 | 2.05 | 1.50 | 1.68 | 1.73 | 2.05 | 4.90 | 1.57 |
| MnO | 0.21 | 0.19 | 0.17 | 0.17 | 0.18 | 0.21 | 0.15 | 0.17 | 0.18 | 0.21 | 0.19 | 0.16 |
| $K_2O$ | 0.97 | 0.89 | 0.80 | 0.77 | 0.82 | 0.97 | 0.71 | 0.80 | 0.82 | 0.97 | 0.86 | 0.74 |
| $Na_2O$ | 2.87 | 2.62 | 2.36 | 2.28 | 2.42 | 2.87 | 2.10 | 2.35 | 2.42 | 2.87 | 2.53 | 2.20 |
| $P_2O_5$ | 0.34 | 0.31 | 0.28 | 0.27 | 0.29 | 0.34 | 0.25 | 0.29 | 0.29 | 0.34 | 0.30 | 0.26 |
| $SO_3$ | 0.09 | 0.08 | 0.07 | 0.07 | 0.08 | 0.09 | 0.07 | 0.07 | 0.08 | 0.09 | 0.08 | 0.07 |
| $F_2$ | 0.09 | 0.08 | 0.07 | 0.07 | 0.08 | 0.09 | 0.07 | 0.07 | 0.08 | 0.09 | 0.08 | 0.07 |
| °F. for log n = 1.0 | 3235 | 2903 | 2666 | 2832 | 2679 | 3235 | 2482 | 2640 | 2637 | 3235 | 2793 | 2935 |
| Liquidus, °F. | 2320 | 2220 | 2284 | 2389 | 2287 | 2320 | 2351 | 2289 | 2345 | 2320 | 2270 | 2516 |
| T (°F.) for log n = 11.0 | 1224 | 1271 | 1292 | 1326 | * | 1224 | 1305 | * | * | 1224 | * | 1315 |

*not determined

The viscosity determinations were obtained using the apparatus and procedure described in U.S. Pat. No. 3,056,283 and in the article in *The Journal of the American Ceramic Society*, Vol. 42, No. 11, November, 1959, pages 537–541. The article is entitled "Improved Apparatus for Rapid Measurement of Viscosity of Glass at High Temperatures" by Ralph L. Tiede. Other specific viscosity determinations referred to herein also would be measured by the apparatus and procedures in the Tiede article.

EXAMPLE II

Basically, production of the present fibers contemplates two steps. First, crushed basalt rock, containing various additives as modifiers, is melted in a crucible, pot, or continuous glass melting unit, depending on the quantity of product wanted and the manner of fiber formation to be utilized. Second, when a suitably homogeneous melt is attained, amorphous fibers are produced from the melt in any conventional manner such as drawing, spinning, or blowing.

Regarding the equipment for the production of mineral wool according to the present invention, one may use any known melting oven for the production of traditional mineral wool. Preferably either a cupola oven or an electric furnace may be employed in combination with any known spinning device.

The melts can be produced in a cupola oven in which is loaded a mixture of Yakima basalt and a source of raw materials for the alkaline earth metal oxide and other additive oxides. Also added is the required quantity of coke for causing a burning and melting. The melt can be fibrated in a traditional spinning aggregate comprising four spinner wheels connected in a cascade.

EXAMPLE III

In order to determine how widely applicable these compositions are to ceiling tile and boards, the temperature for Log n = 11.0 was measured for the glasses. The results are given in Table I. As can be seen, the temperature for Log n = 11.0 increases slightly, while the high temperature viscosity decreases dramatically for the alkaline earth modified basalts.

EXAMPLE IV

A plot of viscosity versus temperature for the basalt control and basalt plus 17.7 weight percent CaO (Example II in Table I) is shown in FIG. 1. The viscosity curves cross at about the fiber softening point (log n = 7.65). The desired effect of decreased high temperature viscosity is graphically shown by FIG. 1. This figure also shows that the alkaline earth modification has little effect on low temperature viscosity.

Also plotted for reference is the viscosity for a typical wool glass composition. The high temperature viscosity of the wool glass and the "modified" basalt are similar. However, the fiber softening point of the wool glass is at least 200° F. lower. This is one reason for the higher temperature capability or "fire resistance" of the mineral wool glasses such as basalt and the modified basalts of this invention.

The basalts modified with alkaline earth metal oxides produce a steeper viscosity curve than does pure basalt. The desirability of a very steep viscosity curve is suggested by the assumption that a glass will not devitrify (rapidly) until it is taken above its softening point. If this were the case, in an actual ceiling board fire test, the outside of the board will be heated above the softening point of the glass before the interior of the board. This will allow the surface fibers to devitrify (and again become stiff) before the interior fibers exceed the glass softening point. It can be seen that as the viscosity curve becomes steeper, a smaller temperature gradient is needed between the center of the board and the board surface for this mechanism to be effective.

INDUSTRIAL APPLICABILITY

In present building construction, acoustical tile should be resistant to shrinkage because it is suspended in a mechanical suspension system. The tiles usually rest along their peripheral edge on an exposed or concealed suspension system. If on heating the tile shrinks excessively, it may fall out of the suspension system and permit penetration of flame and hot gases into the area above the ceiling. Further, the tile must have internal strength on heating so that it does not sag or deform while it is held in the suspension system.

A popular type of acoustical tile is made from the following general procedure. A mixture of granulated mineral wool, fillers, certain coloring materials, if needed, and a binder, particularly one such as thick boiling starch, is prepared for forming the body of the tile. A low density mineral fiberboard product then is formed by flowing the slurry onto a conventional Fourdrinier type board making equipment.

The following example is illustrative being given in detail for a slurry dewatered in a deckle box having a drainage section, a suction section and a pressing section. It is to be understood that consistency, among other factors, may be varied when different apparatus is employed, for example, a cylinder felting machine or a static batch filter.

EXAMPLE V

In forming the low density sheet of this invention a conventional mixer, together with sufficient water to form a slurry of about 3.5% solids, was prepared. The ingredients and percent by weight solids is shown in the following table.

| Ingredients | Percent by Weight Solids |
| --- | --- |
| Perlite (JM, PA-116) | 14.7 |
| Starch (Durobond A) | 7.4 |
| Clay (M+D, M-21) | 15.7 |
| Sizing (Silicone 1101, Dow Corning | 2.5 |
| Mineral Wool (Yakima Basalt + 17.7 wt. % CaO) | 54.1 |
| Paper (Newsprint) | 5.4 |
| Alum | 0.3 |
|  | 100.1% |

The ingredients were weighed out and mixed according to the following procedure. Water for the mineral wool was placed in a large mixer, wool was then added to the mixer and followed by a fiber dispersant (AR-QUAD). The mixture then was mixed until the ingredients were well dispersed. Generally, this will take about 10 minutes at a mixer speed of about 300 r.p.m. Clay and water were then mixed in a Waring blender for 12 minutes and added to the large mixer. Water and pulp were then mixed in the blender at high speeds. After the starch is added to the large mixer, add the pulp, followed by perlite sizing and alum. The entire mixture is then mixed for 20 minutes. A flocculant (Nalco 623jc) was added prior to pumping the slurry to a drain box. Water is then allowed to drain out of the box, which will usually take about 15 to 20 seconds. The drain box is then pulled with a vacuum of 28 inches pressure and the remaining water is drained off. The cake is next pressed to a thickness ranging from ¼" to ⅝". The pressure is held until water stops dripping out, which usually takes about 2 to 3 minutes. The sample is then placed in a steam cabinet for about 30 minutes and then in a drying oven overnight at 300° F.

When desired, a high density facing layer may be embossed, preferably prior to drying the board. This is particularly desirable when forming a product designed to have high esthetic characteristics.

EXAMPLE VI

This invention provides a mineral fiber tile which may be suspended from a system where individual tiles rest along their peripheral edges on an exposed or concealed suspension system. Calculations have shown that up to 1% shrink and 5 centimeters sag can be tolerated without failure of a 2 foot by 4 foot ceiling tile.

The behavior of the large 2 foot by 4 foot panels can be simulated in the laboratory using a 2 inch by 6 inch sample. Loading of a 2 inch by 6 inch by ⅝ inch sample supported only at its ends with a span of 5¾ inches with a 178 gram weight would produce a similar maximum stress in the sample as occurs in a 2 foot by 4 foot by ⅝ inch ceiling tile supported on all four sides. A sag of 0.311 centimeters or 0.122 inch for the smaller sample is equivalent to a 5 centimeter sag for the larger board.

Figure 2:
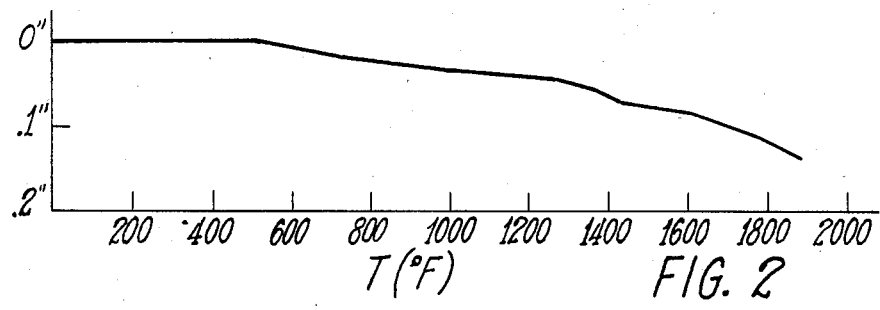
FIGS. 2 and 3 are plots of sag versus "hot face temperature" for a commercial mineral wool ceiling tile and a tile produced according to this invention when heated in a simulated fire test.
Figure 3:
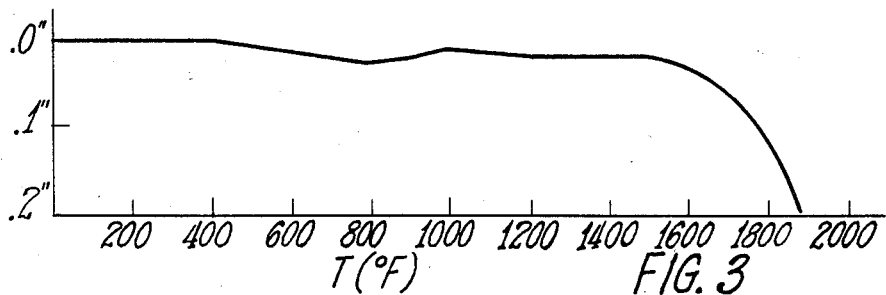

A board containing basalt fibers of this invention (82.3 weight percent Yakima Basalt and 17.7 weight percent CaO) was prepared according to the procedure described in Example V. This board showed about the same shrinkage at 1380° F. as a commercial board. The sag of the board was measured when a 2"×6" sample was loaded with 178 grams at its center. The sample was heated from one side according to ASTM E119 heating rate (conditions which would approximate those experienced in an in-use situation). The sag versus temperature curve for this board and the commercial board are shown in FIGS. 2 and 3. The sag of the experimental board was not significantly different at 1850° F. than the commercial board (1850° F. is the temperature after 2 hours of heating according to ASTM E-119 fire curve).

The percent of shrinkage for the experimental board also was not significantly different than the commercial board. Sag and shrinkage results are set forth in Table 2. Therefore, it would be expected that the basalt fibers of this invention would produce a satisfactory ceiling tile.

TABLE 2

|  | Percentage Shrink at a Temperature of °F. | | | Sag in Inches at a Hot Face Temperature of °F. | |
| --- | --- | --- | --- | --- | --- |
|  | 1112 | 1382 | 1562 | 1400 | 1850 |
| Commercial Ceiling Board | 1.25 | 1.75 | 2.85 | 0.066 | 0.130 |
| Experimental Ceiling Board | 1.05 | 1.70 | 4.40 | 0.020 | 0.155 |

We claim:

1. High softening basalt fibers produced from 95 to 60% by weight natural basalt rock modified with 5.0 to 40.0 weight percent of an additive consisting essentially of only at least one alkaline earth metal oxide wherein the basalt fibers have a composition containing at least 12 weight percent CaO and 15 weight percent or less of MgO, wherein the composition has a viscosity of log n=1.0 at a temperature of 2950° F. or less.

2. Basalt fibers according to claim 1 having a composition containing 12 to 40 weight percent CaO and 2 to 15 weight percent MgO.

3. Basalt fibers according to claim 1 having a composition containing 14 to 30 weight percent CaO and 3 to 12 weight percent MgO.

4. Basalt fibers according to claim 1 having a composition containing 15 to 25 weight percent CaO and 4 to 11 weight percent MgO.

5. Basalt fibers according to claim 1 modified with 10.0 to 30.0 weight percent alkaline earth metal oxides.

6. Basalt fibers according to claim 1 modified with 15.0 to 25.0 weight percent alkaline earth metal oxides.

7. Basalt fibers according to claim 1 modified with 20.0 weight percent alkaline earth metal oxides.

8. Basalt fibers according to claim 1 wherein the alkaline earth metal oxides are MgO and CaO.

9. Basalt fibers according to claim 1 wherein the alkaline earth metal oxides are CaO.

10. Basalt fibers according to claim 1 wherein the natural basalt is a low alkali basalt.

11. Basalt fibers according to claim 1 wherein the natural basalt rock is Oregon Yakima basalt.

12. Basalt fibers according to claim 1 where said basalt is Yakima basalt in an amount of about 83.7% and said additive consists essentially of only CaO in an amount of about 17.7%.

13. Basalt fibers produced from Oregon Yakima basalt rock modified with 10.0 to 30.0 weight percent of an additive which is substantially only CaO or MgO and CaO, wherein the basalt fibers have a composition containing 12 to 40 weight percent CaO and 2 to 15 weight percent MgO,
   wherein the composition has a viscosity of log n=1.0 at a temperature of 2950° F. or less.

14. Basalt fibers produced from Oregon Yakima basalt rock modified with 15.0 to 25.0 weight percent of an additive which is substantially only CaO or MgO and CaO, wherein the basalt fibers have a composition containing 14 to 30 weight percent CaO and 3 to 12 weight percent MgO,
   wherein the composition has a viscosity of log n=1.0 at a temperature of 2950° or less.

15. Basalt fibers of claim 14 wherein said additive is only CaO,
   wherein the resulting composition has a viscosity of log n=1.0 at a temperature of 2950° or less, and
   wherein the fibers have a high softening temperature as indicated by a viscosity of log n=11.0.

16. Ceiling tile or boards produced from the fibers of claim 1.

17. Ceiling tile or boards according to claim 16 wherein the additive is CaO or a mixture of MgO and CaO.

18. Ceiling tile or boards according to claim 16 wherein the basalt rock is Oregon Yakima basalt.

19. Ceiling tile according to claim 16 wherein the alkaline earth metal oxide is CaO.

20. Ceiling tile according to claim 16 wherein the basalt fibers have a composition containing 14 to 30 weight percent CaO and 3 to 12 weight percent MgO.

21. Ceiling tile according to claim 16 wherein the basalt fibers have a composition containing 15 to 25 weight percent CaO and 4 to 11 weight percent MgO.

22. A method of producing mineral wool comprising the steps of:
   a. providing a raw material consisting essentially of 60–95% by weight natural basalt rock modified with 5 to 40 weight percent of an additive consisting essentially of only at least one alkaline earth metal oxide wherein the basalt fibers have a composition containing at least 12 weight percent CaO and 15 weight percent or less of MgO;
   b. melting the raw material;
   c. forming the molten raw material into fibers;
   d. cooling the fibers; and
   e. collecting the cooled fibers
   wherein the composition has a viscosity of log n=1.0 at a temperature of 2950° F. or less, and
   wherein the fibers have a high softening temperature as indicated by a viscosity of log n=11.0.

23. A method according to claim 22 wherein the alkaline earth metal oxides are CaO or a mixture of MgO and CaO.

24. A method according to claim 22 wherein the basalt rock is Oregon Yakima basalt.

25. A method according to claim 22 wherein the alkaline earth metal is CaO.

* * * * *